Nov. 22, 1966      H. C. WILDES      3,286,376
LAWN MOWER ATTACHMENTS
Filed Nov. 19, 1962      3 Sheets-Sheet 1
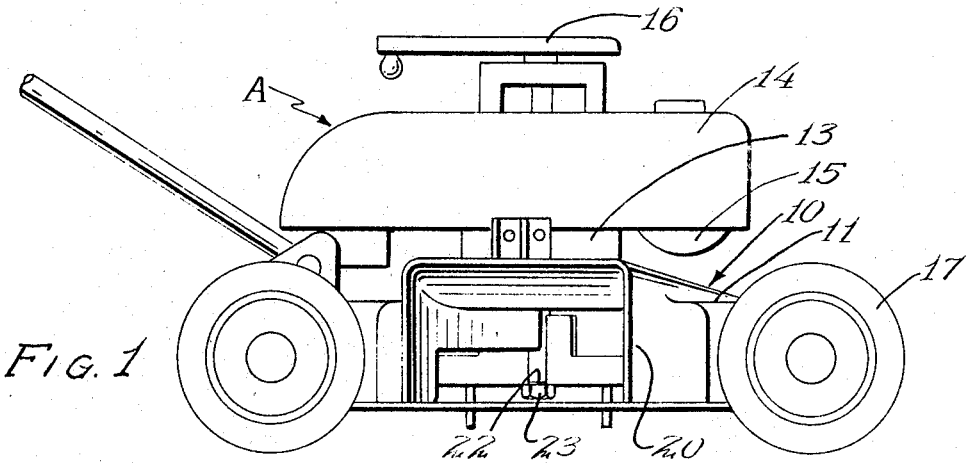
FIG. 1
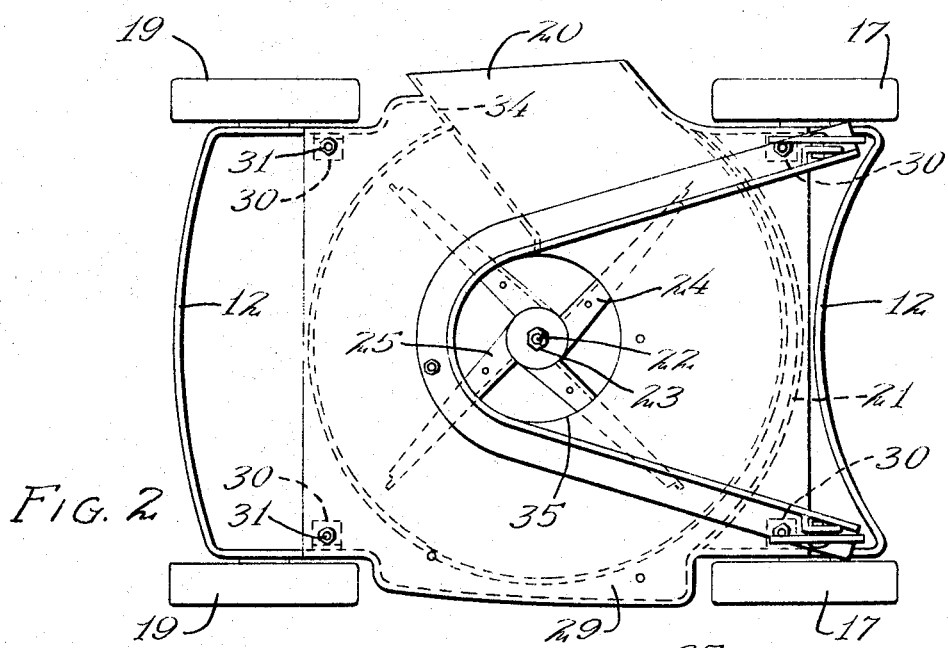
FIG. 2
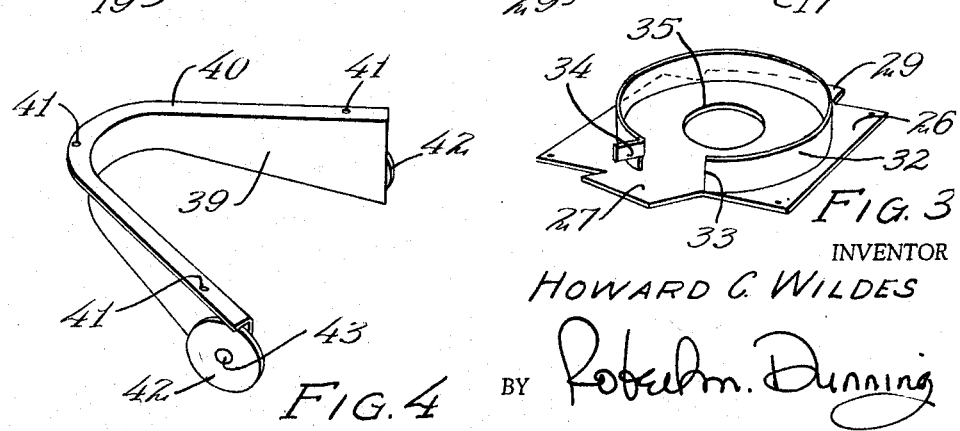
FIG. 3
FIG. 4
INVENTOR
HOWARD C. WILDES
BY Robert M. Dunning
ATTORNEY

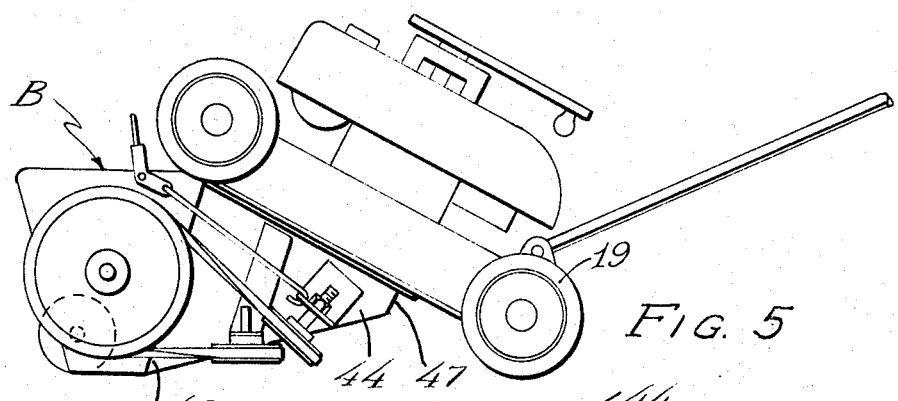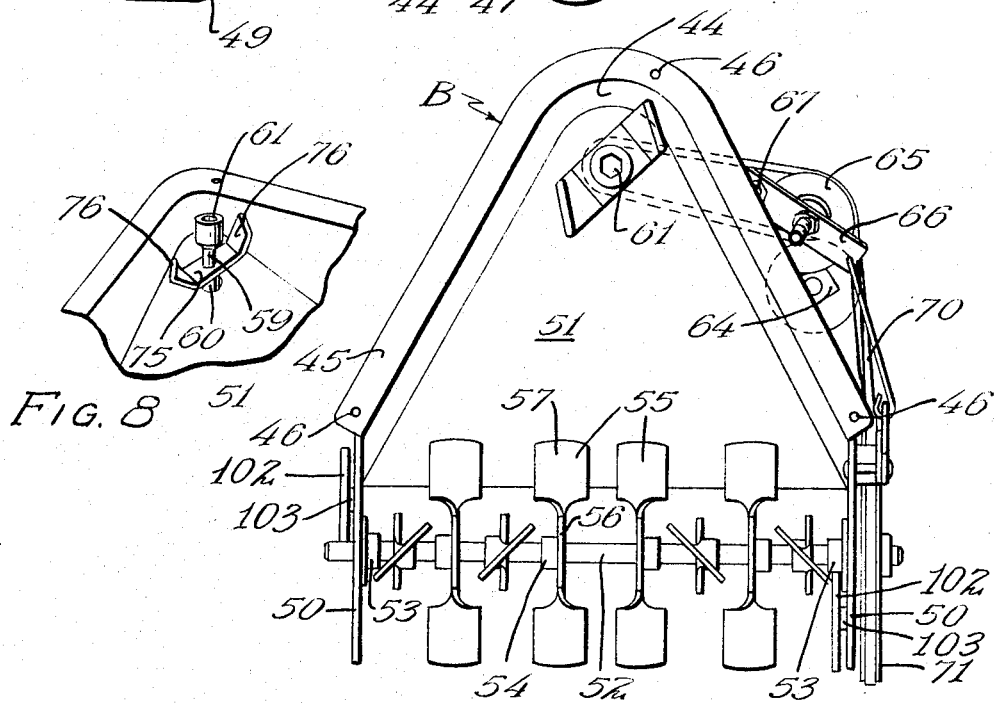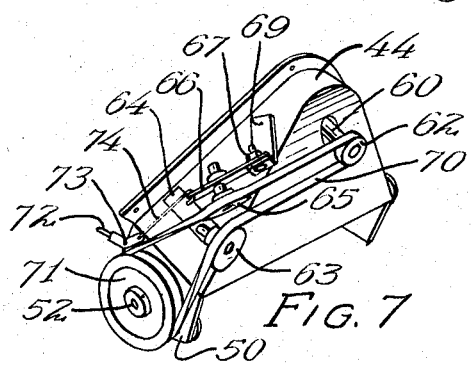

Nov. 22, 1966    H. C. WILDES    3,286,376
LAWN MOWER ATTACHMENTS
Filed Nov. 19, 1962    3 Sheets-Sheet 3

INVENTOR
HOWARD C. WILDES
BY Robert M. Dunning
ATTORNEY

United States Patent Office 3,286,376
Patented Nov. 22, 1966

3,286,376
LAWN MOWER ATTACHMENTS
Howard C. Wildes, 3052 22nd Ave. S.,
Minneapolis, Minn.
Filed Nov. 19, 1962, Ser. No. 238,497
1 Claim. (Cl. 37—43)

This invention relates to an improvement in lawn mower attachments and deals particularly with auxiliary attachments for a lawn mower of the rotary type which may be used in the removal of snow and other material.

In my previous Patent 3,064,369, dated November 20, 1962 for "Snow Plow Attachment for Lawn Mowers," I described a simple attachment which could be used for picking up a relatively shallow layer of snow and blowing it to one side of the sidewalk, driveway, or the like. While this device functions very effectively for its intended purpose, it was not particularly useful in picking up snow of greater depth. Furthermore, in instances where the device was used to pick up leaves or similar materials, it was found desirable to employ a bag or similar receptacle for catching the leaves, so that they would not be redistributed over the lawn. At the same time, it was found that by providing a flexible hose attachment to the bottom of the device, a vacuum cleaner structure could be produced capable of picking up dirt and other materials. It is an object of the present invention to provide an apparatus for accomplishing these results.

A feature of the present invention resides in the provision of an apparatus which may be quickly and easily transformed from one type of apparatus to another. During the summer months, the device functions as a conventional rotary lawn mower. In fall or spring months, it may be readily transformed into an apparatus for picking up leaves. During the winter, the same device may be readily used as a snow blower and is adaptable either for picking up a relatively thin layer of snow, or may be used to remove snow which has fallen to a considerable depth.

A feature of the present invention resides in the fact that all of the structures employ certain of the same basic features. Primarily, the attachment includes a bottom closure plate which is designed to form a closure for the normally open under surface of the mower housing. This closure plate includes an integral volute which may be used with a fan blade on the motor shaft to form a blower. The bottom closure plate is provided with a central intake opening which admits air, together with snow or other material being drawn into the device. By providing a guide suspended beneath the closure plate, snow or other material may be guided beneath the suction opening in position to be drawn upwardly through the volute and out the discharge opening.

A feature of the present invention resides in the provision of a suction manifold which may be attached to the bottom closure plate to extend laterally with respect to the motor housing. This suction manifold is provided with an elongated slot in its under surface which is then in closely spaced relation to the ground or other surface and which serves as a nozzle slot to extend the width of the suction nozzle if it is so desired. This slot also serves as a means of connecting the suction manifold to a flexible tube or similar device through which the dirt may be drawn, the tube acting in the manner of a vacuum tube to convey material to the suction fan when so desired.

A further feature of the present invention resides in the provision of an adapter which may fit over the housing outlet and serve as a means of attachment with a porous bag which may serve as a collector for materials picked up by the suction head.

A further feature of the present invention resides in the provision of an attachment which may be secured underlying the forward portion of the mower housing for picking up snow of considerable depth. This device is provided with an open forward end and tapering sides, and the forward end of the attachment is provided with supporting wheels which may ride on the surface of the ground. When attached, this device supports the mower housing in an upwardly and forwardly inclined position so that a considerable depth of snow may be forced beneath the forward end of the mower housing. This device is preferably provided with a rotary transverse shaft which supports a series of snow raking blades or paddles which finely divide the snow and urge it rearwardly toward the suction opening in the bottom closure plate. Means are provided for driving the snow rakes or paddles from the power shaft of the mower.

An added feature of the present invention resides in the provision of an auxiliary blade which is mounted upon the rotor shaft beneath the intake opening to prevent the clogging of snow in this area.

These and other objects and novel features of the present invention will be more clearly and fully set forth in the following specification and claim. In the drawings forming a part of the specification:

FIGURE 1 is a side elevational view of the mower showing the discharge side thereof.

FIGURE 2 is a bottom plan view of the mower shown in FIGURE 1 showing the bottom closure plate and the tapered guide for guiding a relatively shallow layer of snow toward the suction inlet.

FIGURE 3 is a perspective view, in greatly reduced scale, of the bottom closure plate and volutes secured thereto.

FIGURE 4 is a perspective view of the snow guiding means used in FIGURE 2 of the drawings.

FIGURE 5 is a side elevational view of the same apparatus with the attachment thereon used for picking up a greater depth of snow.

FIGURE 6 is a top plan view of the attachment shown in FIGURE 5 when removed from the mower body.

FIGURE 7 is a perspective view showing one type of drive means for rotating the snow rakes or paddles.

FIGURE 8 is a perspective view of a detail portion of the device showing the auxiliary blade used for maintaining the intake aperture open.

Figure 9:
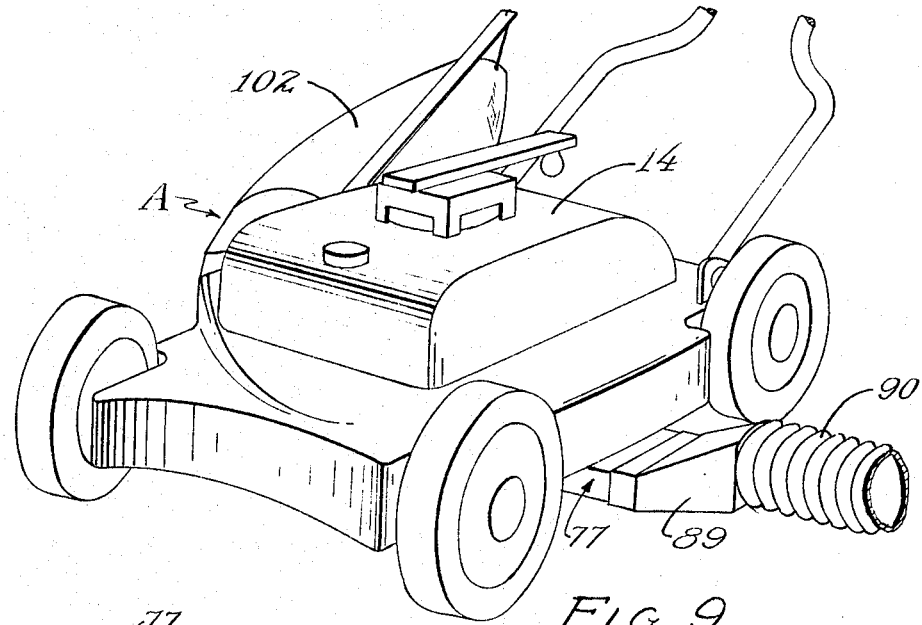
FIGURE 9 is a perspective view of the mower with the suction hose attached thereto.

The mower A may be of a conventional type, and shows a generally rectangular housing 10 having a closed top portion 11 and a depending peripheral skirt 12 extending about its periphery. A motor 13 partially encircled by a shroud 14 is mounted upon the housing top 11 and supports the fuel tank 15. A starting mechanism 16 may be mounted on the top of the motor by means of which the motor may be started in the conventional manner. The mower is supported by a pair of parallel front wheels 17 and a pair of parallel rear wheels 19 which are rotatably supported by the housing in any suitable manner. The peripheral skirt 12 is interrupted by an outlet or discharge manifold 20 through which the mowed grass may pass. The under surface of the housing top 11 may be provided near its forward end with downwardly depending curved wall 21 which normally guides the grass to the outlet 20. The motor 13 is provided with a downwardly projecting shaft 22 which comprises the power shaft, and on which the mower blade is normally mounted by any suitable means such as the removable nut 23.

When using my attachments, the usual double ended cutter blade is usually removed and replaced by a four bladed impeller 24 which is mounted upon the shaft 22 by the nut 23 or by other suitable means. The blades 25 of the impeller 24 are usually angular in cross section and have a vertical height which as nearly as possible fills the place between the bottom closure plate which will be described and the housing top 11 so as to provide as effective a fan blade as is practical.

The closure plate is indicated in reduced size in FIGURE 3 of the drawings, and includes a generally rectangular flat plate 26 having an extension 27 on one side edge designed to underlie the under surface of the normally open discharge 20, and in the arrangement illustrated is provided with a projection 29 on the opposite side edge conforming to the shape of the housing skirt between the front and rear wheels 17 and 19. The corners of the plate 26 are secured to brackets 30 attached to the skirt 12 of the housing 10 by bolts 31 or other such fastening means. A generally spirally shaped volute 32 is secured to the under surface of the closure plate 26, the volute being interrupted as indicated at 33 adjoining the extension 27 underlying the discharge 20. A short wall 34 extends from one end of the volute to the wall 12 of the housing adjoining the discharge. The bottom closure plate 26 is provided with a central intake aperture 35 extending therethrough.

When the bottom closure plate 26 illustrated in FIGURE 3 is in place upon the lower end of the mower housing 10, as illustrated in FIGURE 2 of the drawings, the rotation of the motor shaft 23 acts to rotate the bladed structure 24 within the volute 32, forcing air through the discharge opening 20. This causes air to enter through the suction intake aperture 35, and tends to draw snow, leaves, and other solid objects upwardly and through the volute.

When used for picking up a relatively shallow layer of snow or the like, the guide which is best illustrated in FIGURE 4 of the drawings may be employed. This device comprises a generally U-shaped guide wall 39 which is provided along its upper edge with an outwardly extending flange 40 which is on a common plane. The flange 40 is provided with bolt openings such as 41 which are capable of registering with openings in the bottom closure plate 26 so that the guide wall 39 may be attached to the under surface of the plate. Small wheels or rollers 42 may be pivotally supported upon aligned pivots 43 at the forward of the guide wall 39, the rollers 42 extending to a point just below the lower edge of the guide wall 39 to prevent the guide from dragging on the surface being cleaned.

With reference now to FIGURES 5–8 of the drawings, a snow plow attachment B is illustrated which is capable of collecting and blowing a considerably deeper layer of snow. As indicated in FIGURE 6 of the drawings, the device includes a generally U-shaped wall 44 provided at its upper end with an outturned flange 45 which lies in a single plane. The flange 45 is provided with apertures 46 which are designed to align with corresponding apertures in the bottom closure plate 26. As indicated in FIGURES 5 and 7 of the drawings, the U-shaped wall 44 tapers from a narrow depth at its rear end 47 to a quite material depth at its forward ends 49. In other words, the U-shaped wall structure is generally triangular in side elevation so that the upper edge of the wall may be secured in face relation to the bottom closure plate 26 while the lower edge is generally horizontal but inclined forwardly and downwardly. The forward ends of the wall 44 are bent into parallel relation to provide parallel side plates 50. The lower edges of the wall 44 are connected by a generally triangular bottom panel 51 over which the snow is transferred.

A shaft 52 is rotatably supported by bearings 53 mounted in opposed relation on the parallel plates 50, and the shaft supports a series of hubs 54 to which are attached snow rakes or paddles 55 having parallel intermediate portions 56 and angularly bent ends 57 designed to propel the snow over the bottom plate 51, and to break up chunks of snow into relatively finely divided pieces. The shaft 52 is driven by a drive shaft 59 which is supported by a bearing 60 extending through the bottom plate 51 at a point axially aligned with the motor shaft 22 when the attachment B is in place. The shaft 59 is provided with a socket 61 at its upper extremity which is adapted to accommodate a nut such as 23 on the shaft 22 so as to cause rotation of the shaft 59 in unison with the motor driven shaft 22.

As indicated in FIGURE 7 of the drawings, the lower end of the shaft 60 is provided with a pulley 62 rotatable in unison with the shaft. A second pulley 63 is pivotally supported upon a bracket 64 (FIGURE 6) which is located on one side of the attachment B. A third pulley 65 is pivotally supported upon a lever arm 66 pivotally connected at 67 to a bracket 69 on the wall 44. These pulleys 63 and 65 are designed to change the direction of a flexible belt 70 so that the belt can encircle a fourth pulley 71 mounted upon the end of the shaft 52. A lever 72 is pivotally connected to one side plate 50 at 73, and an end of the lever 72 may be connected to the lever 66 by a suitable link 74. The purpose of this arrangement is to adjust the position of the pulley 65 to the extent necessary to either tighten the belt 70 or to slacken the belt sufficiently so that the belt will not drive the pulley 71 and the shaft 52 supporting the snow rakes 55.

As indicated in FIGURE 8, a blade 75 having angularly turned ends 76 is supported upon the shaft 59 above the bottom plate 51, this blade being located just below the intake opening 35 in the bottom closure plate 26. This blade 75 tends to break up packed snow and to prevent the intake opening from clogging up in operation.

Figure 11:
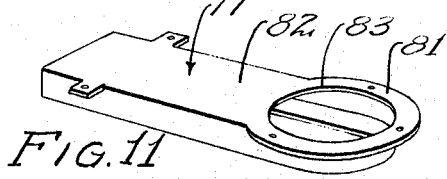
FIGURE 11 is a top perspective view of the suction manifold.
Figure 12:
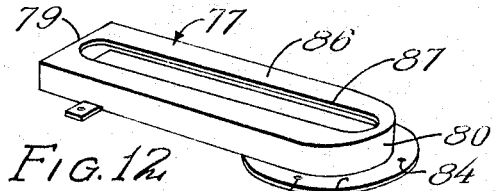
FIGURE 12 is a bottom perspective view of the manifold shown in FIGURE 11.
Figure 13:
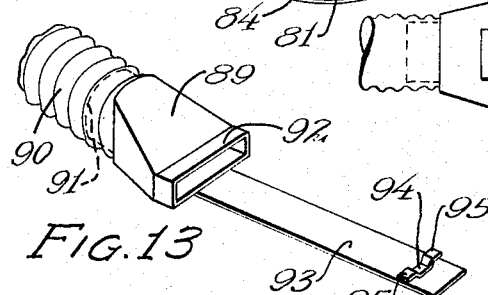
FIGURE 13 is a perspective view of an end of the suction hose showing the manner in which the device is secured to the suction manifold.
Figure 14:
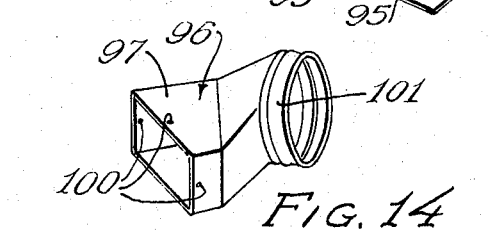
FIGURE 14 is a perspective view of the adapter used in connecting the housing discharge to a porous collecting bag.
Figure 10:
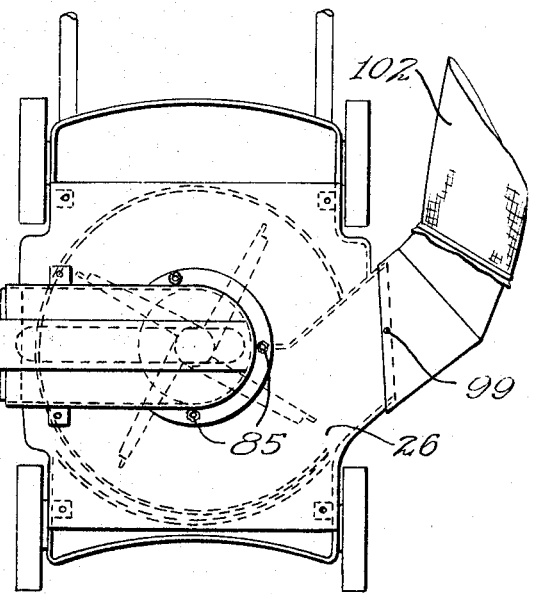
FIGURE 10 is a bottom plan view of the mower with the intake manifold and suction hose connected thereto, the view also showing the adapter connecting the discharge to porous collecting bag.

With reference now to FIGURES 9–14 of the drawings, a suction manifold indicated in general by the numeral 77 may be secured to the under surface of the bottom closure plate 26 in place of either of the snow plow attachments described. The suction manifold 77 comprises an elongated tubular member of generally rectangular cross section having an open end 79 and a rounded closed end 80. A flange 81 which is integral with a side 82 of the manifold defines a circular aperture 83 which is of substantially the same diameter as the intake opening 35 and is designed to register therewith. The flange 81 is provided with apertures 84 designed to accommodate fastening bolts 85 to attach the manifold to the under surface of the bottom closure plate 26. The bottom side 86 of the manifold 77 is provided with an elongated slot 87 which is in close proximity with the ground when the manifold is attached and which extends transversely of the direction of movement of the mower. This slot 87 may serve as a nozzle inlet if desired by closing the open end 79 of the manifold by a suitable cap not illustrated in the drawings. The slot 87 may also serve as a means of attachment with an adapter 89 to which a flexible hose or tube 90 is attached. The tube 90 may be provided with any desired type of inlet nozzle in a manner similar to a vacuum cleaner.

The adapter 89 is provided with a cylindrical end 91 over which the flexible tube 90 is telescoped, and an open rectangular end 92 which is of proper dimensions to fit into the end of the tubular manifold 77. The end 92 is telescoped into the manifold end 79 when the apparatus is attached. A strip 93 is connected to the adapter 89 to extend in parallel relation to the rectangular end 92, the strip 93 being somewhat wider than the slot 87, and of sufficient length to underlie the slot when the adapter is in place. The strip 93 is provided with a bracket 94 having offset ends 95 which extend generally parallel to the surface of the strip 93. When the adapter 89 is to be attached to the manifold 77, the strip 93 is held at an angle to the manifold so that the bracket 94 may extend through the slot. When the strip 93 is turned parallel to the manifold, the offset ends 95 engage the inner surface of the manifold on either side of the slot and hold the strip 93 against the under surface 86 of the manifold. When the strip 93 is parallel to the manifold, the bracket 94 may be slid longitudinally of the slot 87 until the bracket end 92 is telescoped into the end of the manifold 77.

The adapter 96 is employed in conjunction with the discharge 20 from the mower housing 10. The adapter 96 is provided with a hollow rectangular end 97 which is shaped to telescope on to the discharge 20 which projects slightly beyond the surface of the remainder of the housing 10. Fastening means such as the bolts 99 may be inserted through apertures 100 in order to hold the adapter 96 in place. The adapter 96 also includes an angularly extending externally ribbed sleeve 101 designed for attachment with the end of a porous bag 102 which may be used to collect the material drawn into the apparatus, the air passing through the pores of the bag in the manner well known in the vacuum cleaner art.

Thus it will be seen that by merely loosening a few bolts, one attachment may be removed and another attachment added in its place. All of the attachments employ the bottom closure plate 26, and in a very short period of time, the mower may be transformed into a snow blower, leaf collector, or vacuum cleaner with a minimum of difficulty.

When the vacuum cleaning attachment is used, the suction manifold is supported above the ground. However, when the snow plow attachment is used, wheels or rollers 102 support the front end of the tilted mower, the rear end being supported by the mower wheels 19. The rollers 102 are pivotally supported upon opposite side plates 50 by suitable pivots 103.

In accordance with the patent statutes, I have described the principles of construction and operation of my improvement in lawn mower attachments, and while I have endeavored to set forth the best embodiment thereof, I desire to have it understood that changes may be made within the scope of the following claim without departing from the spirit of my invention.

I claim:

In combination, a wheeled housing having a front end and a rear end having a top panel and a depending peripheral wall thereon having a discharge passage therein, a motor mounted on the top panel and including a drive shaft extending downwardly through the top panel, a bottom closure plate extending across the lower end of the peripheral wall and having an intake opening therein substantially concentric with said shaft, a fan blade mounted on said drive shaft between said top panel and said bottom closure plate, a snow collecting member generally U-shaped in plan secured beneath said bottom closure plate, the sides of said collecting member being generally wedge-shaped in side elevation being relatively shallow at its rear end, said snow collecting member holding said bottom closure plate in an upwardly inclined position, the forward end of said snow collecting member being open and the rear end thereof extending about the intake opening in said bottom closure plate to guide snow thereto, a transverse shaft secured to and extending between the sides of said U-shaped snow collecting chamber and having snow breaking members thereupon, and means connecting said transverse shaft and said drive shaft for driving the transverse shaft.

References Cited by the Examiner

UNITED STATES PATENTS

| 1,614,386 | 1/1927 | Peebles. | |
|-----------|--------|----------|---|
| 1,891,175 | 12/1932 | Petersen | 15—385 |
| 2,712,211 | 7/1955 | Smith | 56—25.4 |
| 2,930,068 | 3/1960 | Evanson | 15—351 |
| 2,977,694 | 4/1961 | Higby | 37—436 |
| 2,993,321 | 7/1961 | Hester | 37—436 |
| 3,043,036 | 7/1962 | Trojarek | 56—25.4 |
| 3,064,369 | 11/1962 | Wildes | 37—43 |
| 3,142,913 | 8/1964 | Jacob | 37—43 |

ABRAHAM G. STONE, *Primary Examiner.*

BENJAMIN HERSH, C. O'CONNELL, *Examiners.*

W. B. STONE, G. T. MOLLER, R. L. HOLLISTER, F. B. HENRY, *Assistant Examiners.*